United States Patent [19]

Morris

[11] Patent Number: 4,583,504
[45] Date of Patent: Apr. 22, 1986

[54] LAWN MOWER GEAR REDUCTION SYSTEM

[75] Inventor: Richard L. Morris, Collierville, Tenn.

[73] Assignee: Outboard Marine Corporation, Waukegan, Ill.

[21] Appl. No.: 631,496

[22] Filed: Jul. 16, 1984

[51] Int. Cl.[4] .......................... A01D 34/42; F01L 1/02; F02F 7/00
[52] U.S. Cl. .................. 123/195 R; 56/17.5; 123/90.31
[58] Field of Search .............. 123/195 R, 90.31; 56/255, 17.5

[56] References Cited

U.S. PATENT DOCUMENTS

| 1,647,434 | 11/1927 | Chorlton | 123/195 A |
|---|---|---|---|
| 2,765,779 | 10/1956 | Graves | 123/195 R |
| 3,145,695 | 8/1964 | Conover | 123/90.31 |
| 3,402,707 | 9/1968 | Heron | 123/192 B |
| 3,418,993 | 12/1968 | Scheiterlein et al. | 123/90.31 |
| 3,673,990 | 7/1982 | Alfieri | 123/90.31 |
| 4,048,787 | 9/1977 | Harkness et al. | 56/255 |
| 4,090,346 | 5/1978 | Doi | 56/255 |
| 4,230,074 | 10/1980 | Ichikawa et al. | 123/90.31 |
| 4,464,886 | 8/1984 | Carter | 56/255 |

FOREIGN PATENT DOCUMENTS

| 929500 | 6/1963 | United Kingdom . |
|---|---|---|
| 1089687 | 11/1967 | United Kingdom . |
| 1524973 | 9/1978 | United Kingdom . |
| 2053642 | 2/1981 | United Kingdom . |

Primary Examiner—Craig R. Feinberg
Attorney, Agent, or Firm—Michael, Best & Friedrich

[57] ABSTRACT

A lawn mower comprising a blade housing, an internal combustion engine being supported on the blade housing and including a crankshaft, an output shaft rotatably supported by the blade housing, the output shaft being operably connected to the crankshaft such that rotation of the crankshaft at a given rpm causes rotation of the output shaft at an rpm less than the rpm of the crankshaft, and the output shaft having a cutting blade fixedly mounted thereon and housed within the blade housing.

12 Claims, 4 Drawing Figures

U.S. Patent  Apr. 22, 1986  4,583,504
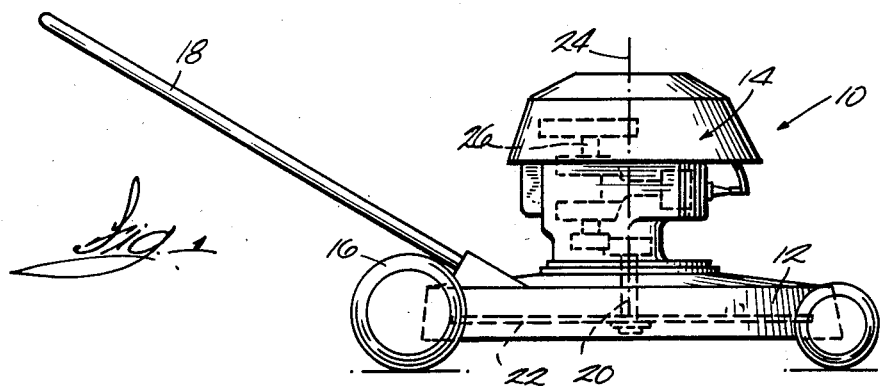
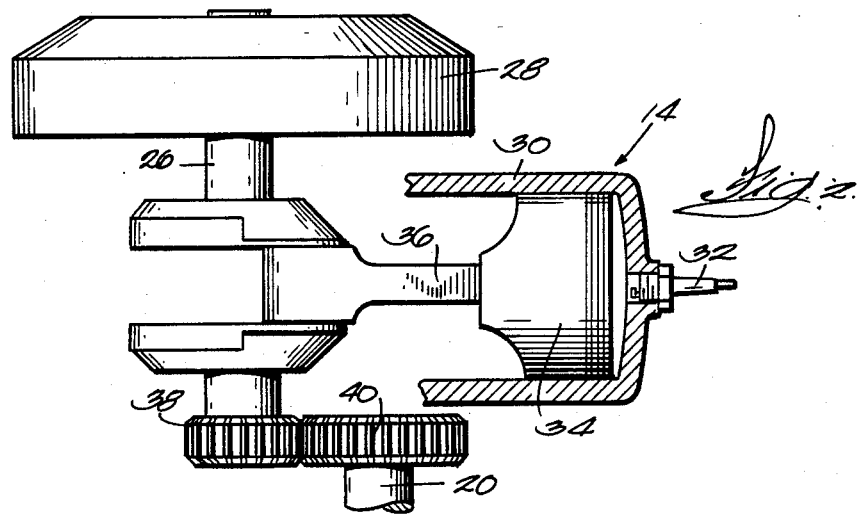
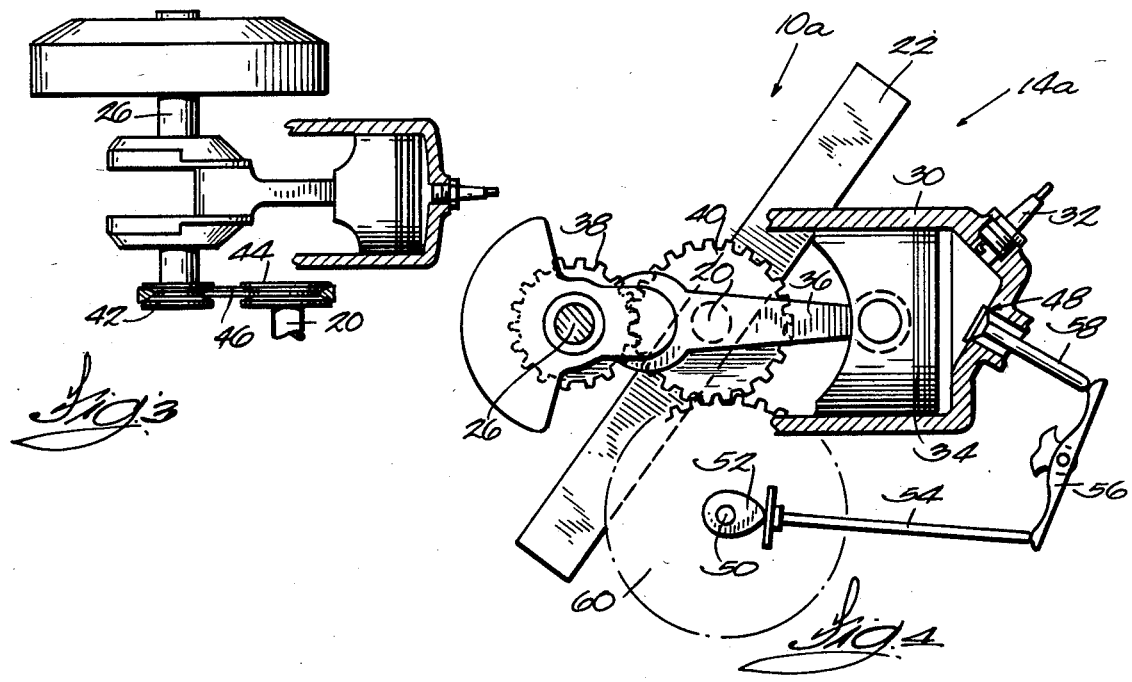

LAWN MOWER GEAR REDUCTION SYSTEM

BACKGROUND OF THE INVENTION

The invention relates to lawn mowers and, more particularly, to means for driving a lawn mower cutting blade with the engine crankshaft.

In prior direct drive or clutchless lawn mowers, the cutting blade is driven by the engine crankshaft so that the blade rpm is the same as the engine rpm. Since legislation limits the cutting tip speed of a lawn mower cutting blade, the engine rpm level in these prior lawn mowers is also effectively limited. The maximum allowable cutting tip speed is presently 19,000 ft./min., and this limits the engine rpm, for example, to 3400 rpm for a 21-inch blade.

Because horsepower is a function of rpm, this also limits the power obtainable from an engine with a given displacement.

With prior lawn mowers having the cutting blade directly driven by the engine crankshaft, the possible locations of the cutting blade relative to the engine are limited. For example, engine crankshafts do not pass through the center of the engine, so that a cutting blade mounted on the engine crankshaft cannot be positioned directly below the center of the engine. In other words, if the cutting blade is in the center of the blade housing, the engine cannot be centered on the blade housing.

Also, with these prior lawn mowers, governor response is slowed by reduced engine speeds.

Attention is directed to Heron U.S. Pat. No. 3,402,707, which discloses an engine gearing system.

SUMMARY OF THE INVENTION

The invention provides a lawn mower comprising a blade housing, an internal combustion engine being supported on the blade housing and including a crankshaft, an output shaft rotatably supported by the blade housing, a cutting blade fixedly muonted on the output shaft and housed within the blade housing, and means operably connecting the output shaft to the crankshaft such that rotation of the crankshaft at a given rpm causes rotation of the output shaft at an rpm less than the rpm of the crankshaft.

The invention also provides a lawn mower comprising a blade housing, an internal combustion engine being supported on the blade housing and including a crankshaft having a longitudinal axis and a cylinder having a cylinder head and a longitudinal axis perpendicular to and intersecting the longitudinal axis of the crankshaft, an output shaft being rotatably supported by the blade housing and having a longitudinal axis parallel to the longitudinal axis of the crankshaft and intersecting the longitudinal axis of the cylinder between the cylinder head and the crankshaft, a cutting blade fixedly mounted on the output shaft and housed within the blade housing, and means operably connecting the output shaft to the crankshaft such that rotation of the crankshaft at a given rpm causes rotation of the output shaft at an rpm less than the rpm of the crankshaft.

In one embodiment, the means operably connecting the output shaft to the crankshaft includes a crankshaft gear having a diameter and being mounted on the crankshaft for rotation therewith, and an output shaft gear having a diameter greater than the diameter of the crankshaft gear and being mounted on the output shaft such that rotation of the output shaft gear causes rotation of the output shaft, the output shaft gear being interengaged with the crankshaft gear such that rotation of the crankshaft gear causes rotation of the output shaft gear.

In one embodiment, the internal combustion engine further includes a camshaft and a camshaft gear mounted on the camshaft such that rotation of the camshaft gear causes rotation of the camshaft, the camshaft gear being interengaged with the output shaft gear such that rotation of the output shaft gear causes rotation of the camshaft gear.

In an alternative embodiment, the means operably connecting the output shaft to the crankshaft includes a crankshaft pulley having a diameter and being mounted on the crankshaft for rotation therewith, an output shaft pulley having a diameter greater than the diameter of the crankshaft pulley and being mounted on the output shaft such that rotation of the output shaft pulley causes rotation of the output shaft, and endless belt means reeved around the crankshaft pulley and the output shaft pulley such that rotation of the crankshaft pulley causes rotation of the output shaft pulley.

The invention also provides a lawn mower comprising a blade housing having a center, an internal combustion engine having a center and being supported on the blade housing at the center of the blade housing, the engine including a crankshaft having opposite first and second ends, a flywheel attached to the crankshaft adjacent the first end, a crankshaft gear having a diameter and being mounted on the crankshaft adjacent the second end for rotation therewith, a camshaft, a camshaft gear mounted on the camshaft such that rotation of the camshaft gear causes rotation of the camshaft, and a piston rod pivotally connected to the crankshaft intermediate the first and second ends, an output shaft being rotatably supported by the blade housing and having a longitudinal axis extending through the center of the blade housing and the center of the engine, a cutting blade fixedly mounted on the output shaft and housed within the blade housing, and an output shaft gear having a diameter greater than the diameter of the crankshaft gear and being mounted on the output shaft such that rotation of the output shaft gear causes rotation of the output shaft, the output shaft gear being interengaged with the crankshaft gear and with the camshaft gear such that rotation of the crankshaft gear causes rotation of the output shaft gear, and such that rotation of the output shaft gear causes rotation of the camshaft gear.

The invention also provides an engine apparatus including an internal combustion engine comprising a crankshaft, an output shaft, and means operable connecting the output shaft to the crankshaft such that rotation of the crankshaft at a given rpm causes rotation of the output shaft at an rpm less than the rpm of the crankshaft.

A principal feature of the invention is that it allows a lawn mower to have greater power from a given engine displacement, because the engine rpm is not limited by the cutting blade rpm.

Another principal feature of the invention is that it allows various options for location of the output shaft relative to the engine, because the output shaft is separated from the crankshaft. For example, the longitudinal axis of the output shaft can pass through the center of the engine, so that the engine is centered on the blade housing.

Another principal feature of the invention is that governor response can be improved by working with higher engine speeds.

Other features and advantages of the invention will become apparent to those skilled in the art upon review of the following detailed description, claims, and drawings.

DESCRIPTION OF THE DRAWINGS

FIG. 1 is a side view of a lawn mower embodying the invention.

FIG. 2 is an enlarged, fragmentary side view, partially in cross section, of the engine and output shaft shown in FIG. 1.

FIG. 3 is a view similar to FIG. 2 showing an alternative embodiment of the means operably connecting the output shaft to the crankshaft.

FIG. 4 is a partial bottom view, partially in cross section, of a lawn mower including a four-stroke engine with a camshaft.

Before explaining one embodiment of the invention in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Illustrated in FIG. 1 is a lawn mower 10 including a blade housing 12 supporting a two-stroke internal combustion engine 14. The blade housing 12 is suitably supported for travel over the ground by a plurality of wheels 16 and is guided for travel over the ground by a handle 18.

As best shown in FIG. 2, the engine 14 includes a generally vertical crankshaft 26 having a longitudinal axis and upper and lower ends. Fixedly attached to the upper end of the crankshaft 26 for rotation therewith is a flywheel 28. The engine 14 also includes a cylinder 30 having a cylinder head supporting a spark plug 32. The cylinder 30 has a generally horizontal longitudinal axis.

The engine 14 further includes a piston 34 slidably received in the cylinder 30 for reciprocal movement therein, and a piston rod 36 having one end pivotally connected to the piston 34 and a second end pivotally connected to the crankshaft 26 intermediate the upper and lower ends of the crankshaft 26. The piston rod 36 is connected to the piston 34 and to the crankshaft 26 in the usual manner.

The blade housing 12 rotatably supports, in the center of the blade housing 12, an output shaft 20 including a lower end supporting and driving a rotary cutting blade 22. The output shaft 20 has a longitudinal axis 24 that is generally parallel to the longitudinal axis of the crankshaft 26, and that intersects the longitudinal axis of the cylinder 30 between the crankshaft 26 and the cylinder head. In the preferred embodiment, the internal combustion engine 14 has a geometric center, i.e., the point located most centrally of the engine configuration, and the longitudinal axis 24 of the output shaft 20 passes through the center of the engine 14. It should be noted that the geometric center of the engine 14 is not necessarily located on the longitudinal axis of the cylinder 30, but can be either above or below that axis.

As best shown in FIG. 2, the output shaft 20 is driven by means operably connecting the output shaft 20 to the crankshaft 26 such that rotation of the crankshaft 26 at a given rpm causes rotation of the output shaft 20 at an rpm less than the rpm of the crankshaft 26. While various suitable means could be employed for this purpose, in the preferred embodiment, this means includes a crankshaft gear 38 fixedly mounted on the lower end of the crankshaft 26, and an output shaft gear 40 fixedly mounted on the upper end of the output shaft 20. The output shaft gear 40 is interengaged with the crankshaft gear 38 such that rotation of the crankshaft gear 38 causes rotation of the output shaft gear 40, and the output shaft gear 40 has a diameter greater than the diameter of the crankshaft gear 38, so that output shaft rpm is less than crankshaft rpm. For example, if the diameter of the output shaft gear 40 is 1.42 times the diamter of the crankshaft gear 38, then a crankshaft rpm of 4,500 results in an output shaft rpm of approximately 3170. Thus, if the cutting blade 22 has a 21 inch diameter, the tip speed of the cutting blade 22 is less than the legislated maximum of 19,00 feet per minute.

Illustrated in FIG. 3 is an alternative construction of the means operably connecting the output shaft 20 to the crankshaft 26. In the construction shown in FIG. 3, the means operably connecting the output shaft 20 to the crankshaft 26 includes a crankshaft pulley 42 fixedly mounted on the crankshaft 26, and an output shaft pulley 44 fixedly mounted on the output shaft 20. The diameter of the output shaft pulley 44 is greater than the diameter of the crankshaft pulley 42. The means also includes an endless belt 46 reeved around the crankshaft and output shaft pulleys 42 and 44 such that rotation of the crankshaft pulley 42 causes rotation of the output shaft pulley 44.

Partially illustrated in FIG. 4 is the engine and cutting assembly of a lawn mower 10a embodying the invention and having a four-stroke engine 14a. (Components of the lawn mower 10a and engine 14a having parts corresponding to the parts in FIGS. 1–3 are given the same reference numeral.)

Like the lawn mower 10 of FIGS. 1 and 2, the lawn mower 10a of FIG. 4 includes an output shaft 20, a cutting blade 22 mounted on the lower end of the output shaft 20, and an output shaft gear 40 mounted on the upper end of the output shaft 20. The engine 14a includes a crankshaft 26 and a crankshaft gear 38 mounted on the lower end of the crankshaft 26 and interengaged with the output shaft gear 40. The diameter of the output shaft gear 40 is greater than the diameter of the crankshaft gear 38 so that the rpm of the output shaft 20 is less than the rpm of the crankshaft 26. The engine 14a also includes a cylinder 30 and a piston 34 slidably received in the cylinder 30 for reciprocal movement therein, and a piston rod 36 having one end pivotally connected to the piston 34 and an opposite end pivotally connected to the crankshaft 26. All of these features of the lawn mower 10a and of the engine 14a are also found in the lawn mower 10 of FIGS. 1 and 2.

Unlike the engine 14 shown in FIGS. 1 and 2, the engine 14a of FIG. 4 is a four-stroke engine. Therefore, the cylinder head includes an exhaust valve 48 along with a spark plug 32, and the engine 14a includes a conventional camshaft arrangement for alternatively opening and closing the exhaust valve 48. As shown in FIG. 4, this arrangement includes a camshaft 50 having a cam 52 fixedly mounted thereon and engaging one end of a lifter 54, with the other end of the lifter 54 being pivotally connected to one end of a rocker arm 56. The other end of the rocker arm 56 is pivotally connected to a valve stem 58, and reciprocal movement of the valve stem 58 causes alternate opening and closing of the exhaust valve 48.

As illustrated in FIG. 4, the camshaft 50 is driven by the camshaft gear 60 which is interengaged with the output shaft gear 40 such that rotation of the output shaft gear 40 causes rotation of the camshaft gear 60. Preferably, the diameter of the camshaft gear 60 is twice the diameter of the crankshaft gear 38, so that the exhaust valve 48 opens once for every two strokes of the piston rod 36 (or two rotations of the crankshaft 26). For example, if the diameter of the output shaft gear 40 is 1.42 times the diameter of the crankshaft gear 38, as in the example above, then the diameter of the camshaft gear 60 is 1.42 times the diameter of the output shaft gear 40, so that the diameter of the camshaft gear 60 is approximately two times the diameter of the crankshaft gear 38. In this case a crankshaft rpm of 4500 results in an output shaft rpm of approximately 3170 and a camshaft rpm of approximately 2250, one-half the crankshaft rpm.

The invention allows the lawn mower 10 to have greater power from a given engine displacement, because the engine rpm is not limited by the cutting blade rpm.

The invention also allows various options for location of the output shaft 20 relative to the engine 14, because the output shaft 20 is separated from the crankshaft 26. For example, in the preferred embodiment, the longitudinal axis 24 of the output shaft 20 passes through the center of the engine 14, so that the engine 14 is centered on the blade housing 12.

Another advantage of the invention is that governor response can be improved by working with higher engine speeds.

Various features of the invention are set forth in the following claims.

I claim:

1. A lawn mower comprising a blade housing, an internal combustion engine supported on said blade housing and including a crankshaft, an output shaft rotatably supported by and centrally of said blade housing and including an end and a part spaced from said end, a cutting blade fixedly mounted on said end of said output shaft and housed within said blade housing, means fixed to said output shaft and to said crankshaft and operably connecting said part of said output shaft to said crankshaft such that rotation of said crankshaft causes rotation of said output shaft, a camshaft extending parallel to said output shaft and rotatably supported by said blade housing, and means fixed on said output shaft and on said camshaft and operably connecting said output shaft to said camshaft to cause rotation of said camshaft in response to rotation of said output shaft.

2. A lawn mower comprising a blade housing, an internal combustion engine supported on said blade housing and including a crankshaft having a longitudinal axis and a cylinder having a cylinder head and a longitudinal axis perpendicular to and intersecting the longitudinal axis of said crankshaft, an output shaft rotatably supported by and centrally of said blade housing and having a longitudinal axis parallel to the longitudinal axis of said crankshaft and intersecting the longituinal axis of said cylinder between said cylinder head and said crankshaft so that said engine is located generally centrally of said blade housing, a cutting blade fixedly mounted on said output shaft and housed within said blade housing, and means operably connecting said output shaft to said crankshaft such that rotation of said crankshaft causes rotation of said output shaft.

3. A lawn mower comprising a blade housing, an internal combustion engine supported on said blade housing and including a crankshaft having a longitudinal axis and a cylinder having a cylinder head and a longitudinal axis perpendicular to and intersecting the longitudinal axis of said crankshaft, an output shaft rotatably supported by and centrally of said blade housing and including an end, a part spaced from said end, and a longitudinal axis parallel to the longitudinal axis of said crankshaft and intersecting the longitudinal axis of said cylinder between said cylinder head and said crankshaft such that said engine is located generally centrally of said block housing, a cutting blade fixedly mounted on said end of said output shaft and housed within said blade housing, means fixed to said output shaft and said crankshaft and operably connecting said part of said output shaft to said crankshaft such that rotation of said crankshaft causes rotation of said output shaft, a camshaft extending parallel to said output shaft and rotatably supported by said blade housing, and means fixed on said output shaft and on said camshaft and operably connecting said output shaft to said camshaft to cause rotation of said camshaft in response to rotation of said output shaft.

4. A lawn mower comprising a blade housing having a center, an internal combustion engine having a center and supported on said blade housing at the center of said blade housing, said engine including a crankshaft having opposite first and second ends, a flywheel attached to said crankshaft adjacent said first end, a crankshaft gear mounted on said crankshaft adjacent said second end for rotation therewith, a camshaft, a camshaft gear mounted on said camshaft for rotation therewith, an output shaft rotatably supported by said blade housing and having a longitudinal axis extending through the center of said blade housing and the center of said engine, a cutting blade fixedly mounted on said output shaft and housed within said blade housing, and an output shaft gear mounted on said output shaft for rotation therewith, said output shaft gear being interengaged with said crankshaft gear and with said camshaft gear such that rotation of said crankshaft causes rotation of said output shaft and of said camshaft.

5. A lawn mower comprising a blade housing, an internal combustion engine supported on said blade housing and including a crankshaft, an output shaft rotatably supported by and centrally of said blade housing and including an end and a part spaced from said end, a cutting blade fixedly mounted on said end of said output shaft and housed within said blade housing, means fixed to said output shaft and said crankshaft and operably connecting said part of said output shaft to said crankshaft such that rotation of said crankshaft at a given rpm causes rotation of said output shaft at an rpm less than that of said crankshaft, a camshaft extending parallel to said output shaft and rotatably supported by said blade housing, and means fixed on said output shaft and on said camshaft and operably connecting said output shaft to said camshaft to cause rotation of said camshaft in response to rotation of said output shaft.

6. A lawn mower as set forth in claim 5 wherein said means operably connecting said output shaft to said crankshaft includes a crankshaft gear having a diameter and being mounted on said crankshaft for rotation therewith, and an output shaft gear having a diameter greater than the diameter of said crankshaft gear and being mounted on said output shaft such that rotation of said output shaft gear causes rotation of said output shaft, said output shaft gear being interengaged with said crankshaft gear such that rotation of said crankshaft gear causes rotation of said output shaft gear.

7. A lawn mower as set forth in Claim 5 wherein said means operably connecting said output shaft to said crankshaft includes a crankshaft pulley having a diameter and being mounted on said crankshaft for rotation therewith, an output shaft pulley having a diameter greater than the diameter of said crankshaft pulley and being mounted on said output shaft such that rotation of said output shaft pulley causes rotation of said output shaft, and endless belt means reeved around said crankshaft pulley and said output shaft pulley such that rotation of said crankshaft pulley causes rotation of said output shaft pulley.

8. A lawn mower comprising a blade housing, an internal combustion engine being supported on said blade housing and including a crankshaft having a longitudinal axis and a cylinder having a cylinder head and a longitudinal axis perpendicular to and intersecting the longitudinal axis of said crankshaft, an output shaft rotatably supported by said blade housing and having a longitudinal axis parallel to the longitudinal axis of said crankshaft and intersecting the longitudinal axis of said cylinder between said cylinder head and said crankshaft so that said engine is located generally centrally of said blade housing, a cutting blade fixedly mounted on said output shaft and housed within said blade housing, and means operably connecting said output shaft to said crankshaft such that rotation of said crankshaft at a given rpm causes rotation of said output shaft at an rpm less than the rpm of said crankshaft.

9. A lawn mower as set forth in claim 8 wherein said engine has a geometric center, and wherein the longitudinal axis of said output shaft passes through the center of said engine.

10. A lawn mower as set forth in claim 8 wherein said means operably connecting said output shaft to said crankshaft includes a crankshaft pulley having a diameter and being mounted on said crankshaft for rotation therewith, an output shaft pulley having a diameter greater than the diameter of said crankshaft pulley and being mounted on said output shaft such that rotation of said output shaft pulley causes rotation of said output shaft, and endless belt means reeved around said crankshaft pulley and said output shaft pulley such that rotation of said crankshaft pulley causes rotation of said output shaft pulley.

11. A lawn mower as set forth in claim 8 wherein said means operably connecting said output shaft to said crankshaft includes a crankshaft gear having a diameter and being mounted on said crankshaft for rotation therewith, and an output shaft gear having a diameter greater than the diameter of said crankshaft gear and being mounted on said output shaft such that rotation of said output shaft gear causes rotation of said output shaft, said output shaft gear being interengaged with said crankshaft gear such that rotation of said crankshaft gear causes rotation of said output shaft gear.

12. A lawn mower as set forth in claim 11 wherein said internal combustion engine further includes a camshaft and a camshaft gear mounted on said camshaft such that rotation of said camshaft gear causes rotation of said camshaft, said camshaft gear being interengaged with said output shaft gear such that rotation of said output shaft gear causes rotation of said camshaft gear.

* * * * *